United States Patent
Kaidu et al.

(10) Patent No.: US 11,658,592 B2
(45) Date of Patent: May 23, 2023

(54) MOTOR CONTROL CIRCUIT, MOTOR DRIVE CONTROL APPARATUS AND CONTROL METHOD FOR MOTOR CONTROL CIRCUIT

(71) Applicant: MINEBEA MITSUMI Inc., Nagano (JP)

(72) Inventors: Hiroyuki Kaidu, Kakegawa (JP); Masato Aoki, Iwata (JP); Takamichi Kitano, Kakegawa (JP); Takahiro Suzuki, Fukuroi (JP)

(73) Assignee: MINEBEA MITSUMI Inc., Nagano (JP)

( * ) Notice: Subject to any disclaimer, the term of this patent is extended or adjusted under 35 U.S.C. 154(b) by 139 days.

(21) Appl. No.: 17/244,008

(22) Filed: Apr. 29, 2021

(65) Prior Publication Data
US 2021/0367540 A1 Nov. 25, 2021

(30) Foreign Application Priority Data
May 20, 2020 (JP) .............................. JP2020-088414

(51) Int. Cl.
| | |
|---|---|
| *H02P 6/182* | (2016.01) |
| *H02P 6/28* | (2016.01) |
| *G05B 19/042* | (2006.01) |
| *H02P 6/16* | (2016.01) |
| *H02P 27/08* | (2006.01) |

(52) U.S. Cl.
CPC .............. *H02P 6/28* (2016.02); *G05B 19/042* (2013.01); *H02P 6/16* (2013.01); *G05B 2219/23399* (2013.01); *H02P 27/08* (2013.01)

(58) Field of Classification Search
CPC ... H02P 6/28; H02P 6/16; H02P 6/182; G05B 2219/23399
See application file for complete search history.

(56) References Cited

U.S. PATENT DOCUMENTS

| | | | |
|---|---|---|---|
| 2015/0171780 A1* | 6/2015 | Ko ........................ | H02P 6/182 318/400.06 |
| 2019/0039645 A1* | 2/2019 | Kuwahara .............. | G01D 5/244 |

FOREIGN PATENT DOCUMENTS

JP 2010-063325 A 3/2010

* cited by examiner

*Primary Examiner* — Cortez M Cook
(74) *Attorney, Agent, or Firm* — Pearne & Gordon LLP

(57) ABSTRACT

The present disclosure provides a motor control circuit enabled to change or adjust functions to be implemented to suppress an increase in cycle time during mass production. A motor control circuit according to an exemplary embodiment of the present disclosure is a motor control circuit to control a motor driver including a first non-volatile memory and a second non-volatile memory, and the first non-volatile memory stores a control algorithm and a first parameter group to be used by the control algorithm of the motor control circuit, and the second non-volatile memory is enabled to store a second parameter group to be used by the control algorithm.

8 Claims, 9 Drawing Sheets

MOTOR CONTROL CIRCUIT, MOTOR DRIVE CONTROL APPARATUS AND CONTROL METHOD FOR MOTOR CONTROL CIRCUIT

CROSS REFERENCE TO RELATED APPLICATIONS

This application claims the benefit of Japanese Patent Application No. 2020-088414, filed May 20, 2020, which is hereby incorporated by reference in its entirety.

BACKGROUND

Technical Field

The present disclosure relates to a motor control circuit, a motor drive control apparatus and a control method for the motor control circuit.

Background

In recent years, motor control circuits used for a motor drive control apparatus or the like to drive a fan motor can change or adjust various functions controlled by the motor control circuits such as the number of rotations and an advance angle by changing parameters stored in a built-in non-volatile memory. As a result, adopting a configuration capable of changing/adjusting the functions makes it possible to eliminate the necessity for external parts and reduce the cost and substrate area.

For example, Japanese Patent Laid-Open No. 2010-63325 describes a motor control apparatus equipped with a non-volatile memory storing a correction gain of a current sensor as a parameter. The motor control apparatus corrects the current sensor using the correction gain stored in the non-volatile memory, and has no need to separately add a current sensor for inspection.

According to the motor control circuit included in the motor control apparatus described in Japanese Patent Laid-Open No. 2010-63325, various functions can be implemented by the control algorithm executing a program using the parameters stored in the non-volatile memory as described above. In such a motor control circuit, it is often the case that the control algorithm and the parameters forming the program are stored in two non-volatile memories separately to achieve an inexpensive configuration.

On the other hand, during mass production, it is necessary to use different methods to write the control algorithm and the parameters to the two non-volatile memories. For this reason, the conventional motor control circuits lead to a situation where cycle time, which is a process work time during mass production, increases.

In order to avoid such a situation, the control algorithm and the parameters may be written to one non-volatile memory during mass production.

However, when writing the control algorithm and the parameters to one non-volatile memory is assumed, this leads to the following situations. Configuring a storage region of the control algorithm so as to include a storage region of the parameters makes it difficult to rewrite the parameters easily, thus preventing the parameters from being easily changed along with a change/adjustment of the function during the development of the motor control circuit or the like. When the storage region of the control algorithm and the storage region of the parameters are provided separately, the cycle time, which is a process work time during mass production, may increase similarly as in the case where the control algorithm and the parameters are stored in the two non-volatile memories separately.

SUMMARY

The present disclosure is related to suppressing increase of the cycle time during mass production in a motor control circuit enabled to change or adjust functions to be implemented.

In accordance with one aspect of the present disclosure, a motor control circuit is a motor control circuit to control a motor driver, provided with a first storage region and a second storage region, the first storage region storing a control algorithm of the motor control circuit and a first parameter group used by the control algorithm and the second storage region being enabled to store a second parameter group used by the control algorithm.

According to the motor control circuit of the present disclosure, it is possible to suppress increase of the cycle time during mass production in a motor control circuit enabled to change or adjust functions to be implemented.

Preferably, the second storage region includes a specification parameter to specify whether the first parameter group or the second parameter group is used by the control algorithm to execute a motor control program, and the control algorithm may read a value of the specification parameter at a startup and execute the motor control program using the parameter group specified with the read value.

Preferably, when the specification parameter is set to an initial value, the control algorithm may execute the motor control program using the first parameter group.

Preferably, the control algorithm may execute the motor control program using either the first parameter group or the second parameter group to output a drive control signal for controling of driving of a motor to the motor driver.

According to these disclosures, a motor drive control apparatus according to an exemplary embodiment of the present disclosure includes the motor control circuit described in the above and a motor driver configured to drive the motor based on a drive control signal outputted from the motor control circuit.

According to these disclosures, a control method for a motor control circuit according to an exemplary embodiment of the present disclosure is a control method for a motor control circuit provided with a first storage region storing a control algorithm of the motor control circuit and a first parameter group to be used by the control algorithm and a second storage region enabled to store a second parameter group to be used by the control algorithm, and configured to output a drive control signal to the motor driver, the method including referencing a value of a specification parameter in the second storage region when the control algorithm is started, determining whether the first parameter group or the second parameter group is used by the control algorithm to execute a motor control program based on the value of the specification parameter and executing of the control algorithm the motor control program using the determined parameter group.

Preferably, in the determining when the value of the specification parameter is set to an initial value, the control algorithm may determine to execute the motor control program using the first parameter group stored in the first storage region.

DETAILED DESCRIPTION

Figure 1:
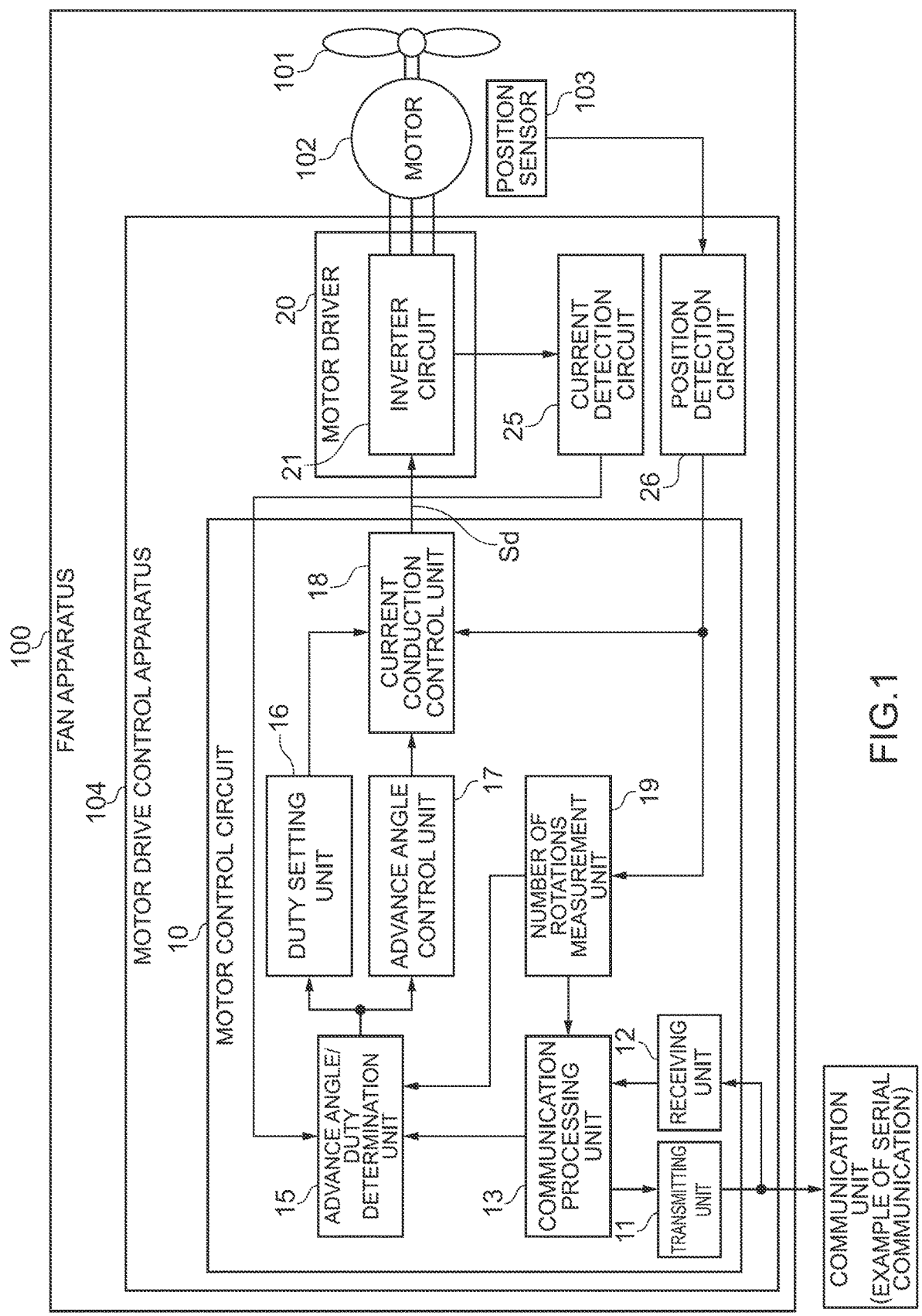
FIG. 1 is a schematic configuration diagram illustrating an example of a fan apparatus equipped with a motor drive control apparatus including a motor control circuit.

Hereinafter, specific examples of the present embodiments will be described with reference to the accompanying drawings. Note that common components among the respective embodiments are assigned identical reference numerals and duplicate description is omitted in the following description.

A motor control circuit according to the present embodiments can be used, for example, as a circuit for generating a drive control signal in a motor drive control apparatus mounted on a fan apparatus. First, the fan apparatus equipped with the motor drive control apparatus including the motor control circuit of the present embodiments will be described.

FIG. 1 is a schematic configuration diagram illustrating an example of a fan apparatus 100 equipped with a motor drive control apparatus 104 including a motor control circuit 10. The fan apparatus 100 is provided with an impeller 101, a motor 102, a position sensor 103 and a motor drive control apparatus 104.

As illustrated in FIG. 1, in the fan apparatus 100, the impeller 101 is connected to the motor 102 and rotates along with rotation of a rotor of the motor 102 (also referred to as "rotation of the motor 102"). The motor 102 is rotationally driven by the motor drive control apparatus 104. As the motor 102, for example, a three-phase brushless motor can be used, but the type of the motor is not particularly limited, and the number of phases is not limited to 3 either.

The position sensor 103 outputs a signal corresponding to a rotational position of the rotor of the motor 102 to the motor drive control apparatus 104. In the present embodiment, the motor drive control apparatus 104 estimates the rotational position of the rotor from an output signal of a Hall element as the position sensor 103 and generates the rotational position signal of the rotor. The position sensor 103 is not limited to the Hall element or is not particularly limited as long as the position sensor 103 is a sensor that can identify the rotational position of the rotor of the motor 102. The position sensor 103 may also be of a sensor-less type without any position sensor.

The motor drive control apparatus 104 rotationally drives the motor 102 by providing a drive current (also referred to as a "motor current") to a three-phase armature coil of the motor 102 based on the rotational position signal of the rotor. The motor drive control apparatus 104 includes a motor control circuit 10 configured to generate a drive control signal Sd to control the drive of the motor 102, a motor driver 20 including an inverter circuit 21 configured to provide a drive current to the motor 102 based on the drive control signal Sd, a current detection circuit 25 configured to detect a drive current of the motor driver 20 and a position detection circuit 26 configured to detect the rotational position of the rotor based on an output signal from the position sensor 103 and generate a rotational position signal.

The motor control circuit 10 can be accessed, for example, via a communication unit. When a target number of rotations is instructed from a higher apparatus configured to instruct operation of the fan apparatus 100 via the communication unit, the motor control circuit 10 outputs the drive control signal Sd to the motor driver 20 so that the rotation of the motor 102 becomes the target number of rotations. Upon receiving a notification request about the actual number of rotations (also referred to as a "current number of rotations") from the higher apparatus, the motor control circuit 10 can also notify the higher apparatus of the actual number of rotations of the motor 102 per current unit time.

The rotational position signal generated in the position detection circuit 26 is inputted to the motor control circuit 10. The motor control circuit 10 can measure the actual number of rotations, which is the actual number of rotations of the motor 102 per current unit time based on the rotational position of the rotor obtained from the rotational position signal generated in the position detection circuit 26. The motor control circuit 10 can output the drive control signal Sd to the motor driver 20 so that the rotation of the motor 102 becomes the target number of rotations in accordance with the measured actual number of rotations.

The motor driver 20 includes the inverter circuit 21 and the inverter circuit 21 provides a drive current to the motor 102 based on the drive control signal Sd outputted from the motor control circuit 10.

The current detection circuit 25 detects the drive current from the inverter circuit 21 as a motor current and inputs the drive current to the motor control circuit 10. The motor control circuit 10 outputs the drive control signal Sd for controlling the drive of the motor driver 20 so that the motor current becomes a desired value.

The motor control circuit 10 is provided with a transmitting unit 11, a receiving unit 12, a communication processing unit 13, an advance angle/duty determination unit 15, a duty setting unit 16, an advance angle control unit 17, a current conduction control unit 18 and a number of rotations measurement unit 19 as functional units to perform control and notification based on an instruction of the higher apparatus and output the drive control signal Sd. These functional units are implemented by the hardware configuration of the motor control circuit 10 executing predetermined processing.

The transmitting unit 11 transmits any given signal to a higher apparatus or an external apparatus via the communication unit and the receiving unit 12 receives any given signal from the higher apparatus or the external apparatus via the communication unit. The transmitting unit 11 and the receiving unit 12 implement interface functions configured to transmit or receive predetermined contents under the control of the communication processing unit 13.

Upon receiving an instruction about the target number of rotations of the motor from the higher apparatus, the communication processing unit 13 notifies the advance angle/duty determination unit 15 of the target number of rotations. Upon receiving a notification request for the number of rotations from the higher apparatus, the communication processing unit 13 transmits information on the actual number of rotations, which is information indicating the actual number of rotations of the motor 102 received from the number of rotations measurement unit 19 to the higher apparatus requesting the notification via the transmitting unit 11.

The advance angle/duty determination unit 15 implements a function to determine a predetermined advance angle value corresponding to the target number of rotations and a duty ratio adjusted so as to achieve the target number of rotations as a combination of the advance angle value of the drive control signal Sd and the duty ratio.

The advance angle/duty determination unit 15 outputs an advance angle value of the drive control signal Sd defined in advance as the advance angle value of the drive control signal Sd corresponding to the target number of rotations to the advance angle control unit 17 and outputs any given duty ratio to the duty setting unit 16. For the advance angle value of the drive control signal Sd defined in advance as the advance angle value of the drive control signal Sd corresponding to the target number of rotations, a combination of the target number of rotations and the corresponding advance angle value of the drive control signal Sd may be stored in a memory (first non-volatile memory 3, second non-volatile memory 4 illustrated in FIG. 2), as parameters which will be described later. It is possible to generate the drive control signal Sd with the advance angle value determined by executing a motor control program (also referred to as a "program") by a control algorithm using the parameter group stored in the memory. Any given duty ratio is determined to such a value that the number of rotations of the motor 102 inputted as feedback converges to the target number of rotations. As the actual number of rotations of the motor 102, one acquired from the number of rotations measurement unit 19 can be used. Regarding any given duty ratio, it is also possible to generate the drive control signal Sd with the duty ratio determined by executing the program according to the control algorithm using the parameter group stored in the memory.

The current conduction control unit 18 functions as a drive control signal generation unit configured to generate the drive control signal Sd based on the combination of the advance angle value and the duty ratio of the drive control signal Sd determined in the duty setting unit 16 and the advance angle control unit 17.

The duty setting unit 16 and the advance angle control unit 17 notify the current conduction control unit 18 of the determined advance angle value and duty ratio of the drive control signal Sd. The current conduction control unit 18 generates the drive control signal Sd to control the drive of the inverter circuit 21 of the motor driver 20 with the notified advance angle value and duty ratio. The current conduction control unit 18 can take timing of generating the drive control signal Sd based on the rotational position signal generated in the position detection circuit 26. The current conduction control unit 18 controls and outputs the drive control signal Sd so that the phase of the drive signal of the inverter circuit 21 becomes a predetermined advance angle value with reference to the rotational position signal generated in the position detection circuit 26 based on the determined advance angle value of the drive control signal Sd. Furthermore, the current conduction control unit 18 controls and outputs the duty ratio of the drive control signal Sd generated, for example, as a PWM signal based on the duty ratio of the drive control signal Sd.

Figure 2:
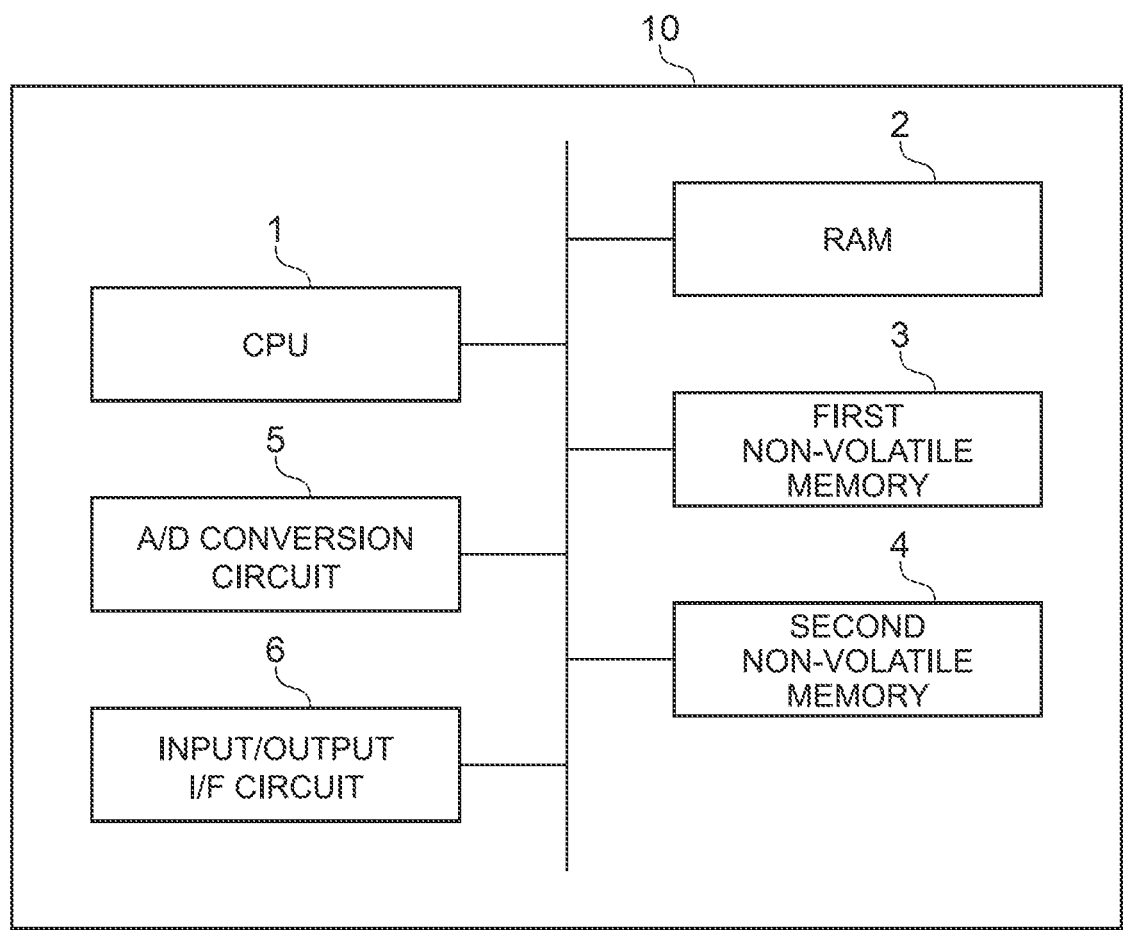
FIG. 2 is a block diagram illustrating a hardware configuration example of the motor control circuit.

FIG. 2 is a block diagram illustrating a hardware configuration example of the motor control circuit 10. As illustrated in FIG. 2, the motor control circuit 10 is constructed of a program processing apparatus (for example, microcontroller: MCU) including hardware elements such as a CPU 1, a RAM 2, a first non-volatile memory 3 (an example of the first storage region), a second non-volatile memory 4 (an example of the second storage region), an A/D conversion circuit 5, an input/output I/F circuit 6 and a clock circuit, with the respective components connected to each other via a bus or dedicated line.

In the motor control circuit 10, the CPU 1 functioning as a processor performs various computations according to a program stored in the first non-volatile memory 3 or the second non-volatile memory 4 and called by the RAM 2, and controls the A/D conversion circuit 5 and the input/output I/F circuit 6 to thereby implement the components of the respective functional units in the motor control circuit 10 illustrated in FIG. 1.

As illustrated in FIG. 2, in the motor control circuit 10 of the present embodiment, the CPU 1 functioning as a processor calls the program stored in the first non-volatile memory 3 or the second non-volatile memory 4, stores the program in the RAM 2 and performs various computations according to the program stored in the RAM 2, and thereby implements the aforementioned various functions. The program executed by the CPU 1 includes a control algorithm and a parameter group, and the various functions implemented by the program can be changed or adjusted according to each parameter. For example, functions such as a current conduction scheme can be changed according to the parameter group. It is possible to change the drive control signal Sd of the motor control circuit 10 according to the parameter group as appropriate and can thereby adjust the functions to be implemented. Examples of the parameter include a "curve of number of rotations of the motor" and an "advance angle value" in the case of the fan apparatus of the present embodiment, and the parameter is not particularly limited as long as the parameter is used to change or adjust the function.

Figure 3:
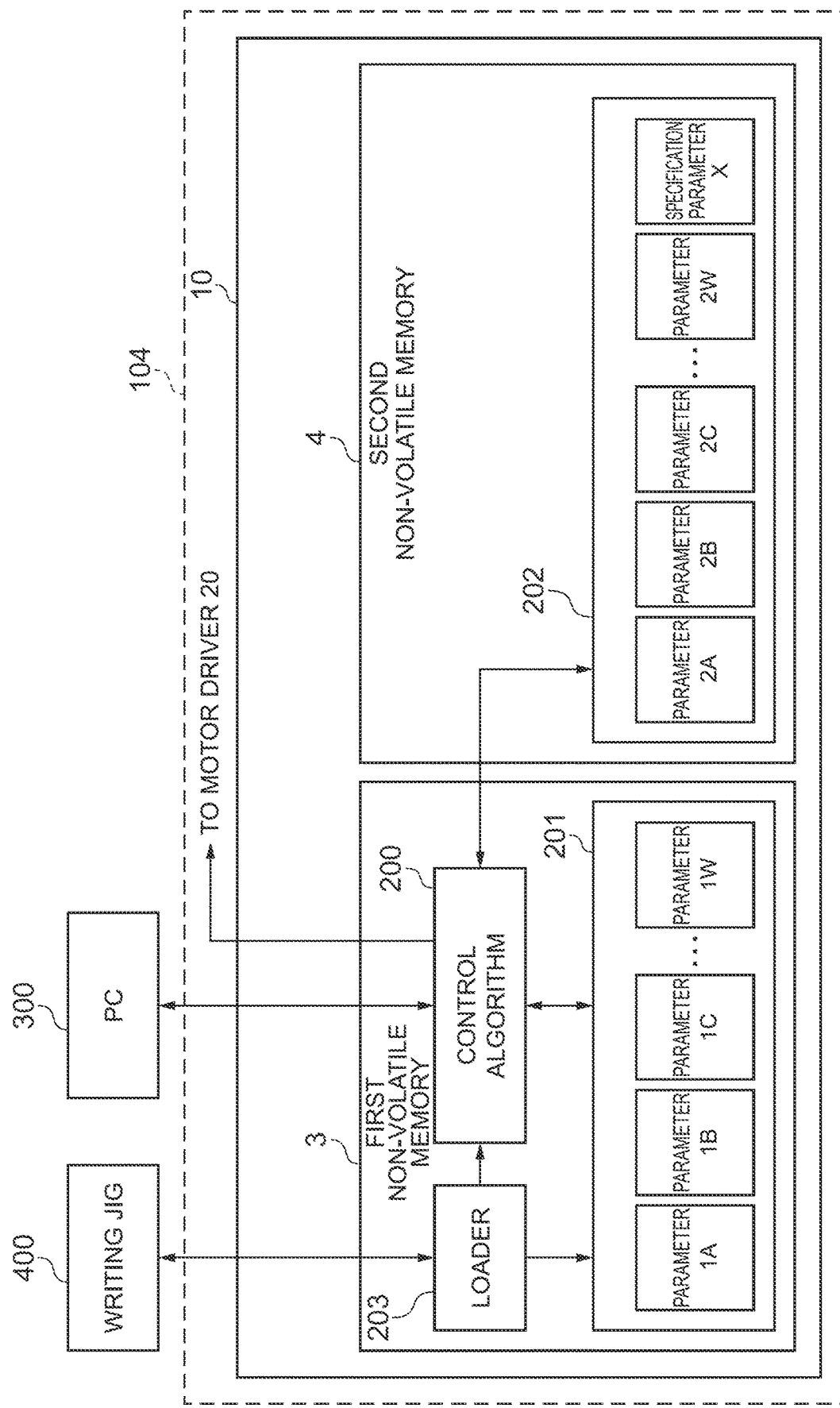
FIG. 3 is a diagram describing a motor control program stored in a first non-volatile memory and a second non-volatile memory.

FIG. 3 is a diagram describing a motor control program stored in the first non-volatile memory 3 and the second non-volatile memory 4. The motor control circuit 10 of the present embodiment is provided with two non-volatile memories 3 and 4.

Since the first non-volatile memory 3 is not intended to be rewritten, any given non-volatile memory can be used as the first non-volatile memory 3 whether it is rewritable or not. Examples of the non-volatile memory usable as the first non-volatile memory 3 include a ROM (read only memory), a flash memory, an EPROM (erasable programmable ROM), an EEPROM (electrically erasable programmable ROM), but the non-volatile memory is not limited to them.

As the second non-volatile memory 4, unlike the first non-volatile memory 3, a memory supposed to be rewritten can be used. Examples of the non-volatile memory usable as the second non-volatile memory 4 include a flash memory, an EPROM (erasable programmable ROM), an EEPROM (electrically erasable programmable ROM), and the second non-volatile memory 4 is not limited to them as long as it is rewritable non-volatile memory.

The motor control circuit 10 of the present embodiment is supposed to store both the control algorithm 200 forming the program and the first parameter group 201 used to implement basic functions in the first non-volatile memory 3 during mass production. The second non-volatile memory 4 does not use the second parameter group 202 other than a specification parameter X during mass production. By storing the control algorithm 200 and the first parameter group 201 corresponding to mass production only in the first non-volatile memory 3, storage of the program can be executed in one step, and so it is possible to suppress an increase in cycle time. On the other hand, it is possible to change the second parameter group 202 as appropriate from an external apparatus such as a PC (personal computer) 300 in the second non-volatile memory 4 at timing different from during mass production such as during development before mass production, at the time of a change or adjustment after mass production. By changing the second parameter group 202 different from the first parameter group 201 as appropriate for the second non-volatile memory 4, it is possible to change or adjust the function to be implemented as appropriate by executing the program (execution of the motor control program using the second parameter group 202 according to the control algorithm 200).

In the motor control circuit 10, the second non-volatile memory 4 includes the specification parameter X, a value of which can be changed as appropriate. This specification parameter X specifies which of the first parameter group 201 (parameters 1A, 1B, . . . 1W) where the control algorithm 200 is stored in the first non-volatile memory 3 or the second parameter group 202 (parameters 2A, 2B, . . . 2W) where the control algorithm 200 is stored in the second non-volatile memory 4 is used to execute the motor control program. In the motor control circuit 10, when the CPU 1 starts the control algorithm 200 stored in the first non-volatile memory 3, the control algorithm 200 references the value of the specification parameter X, and the control algorithm 200 thereby determines whether the first parameter group 201 or the second parameter group 202 is used and executes the motor control program using the determined parameter group. As describes so far, it is possible to implement the functions changed or adjusted as required.

(Control Method for Motor Control Circuit)

Figure 4:
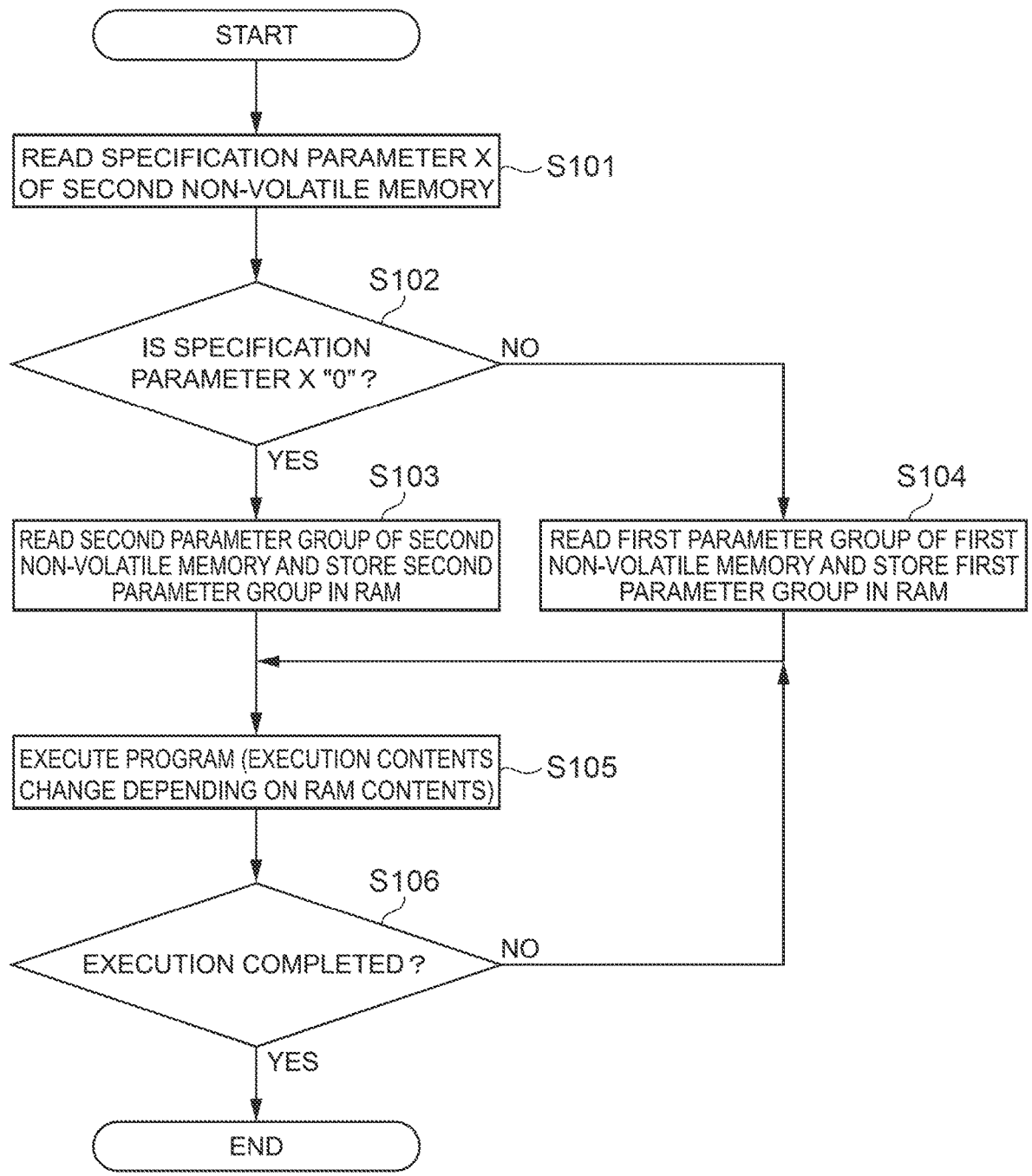
FIG. 4 is a flowchart showing processing for a control algorithm to read a parameter group and execute a motor control program.
Figure 5:
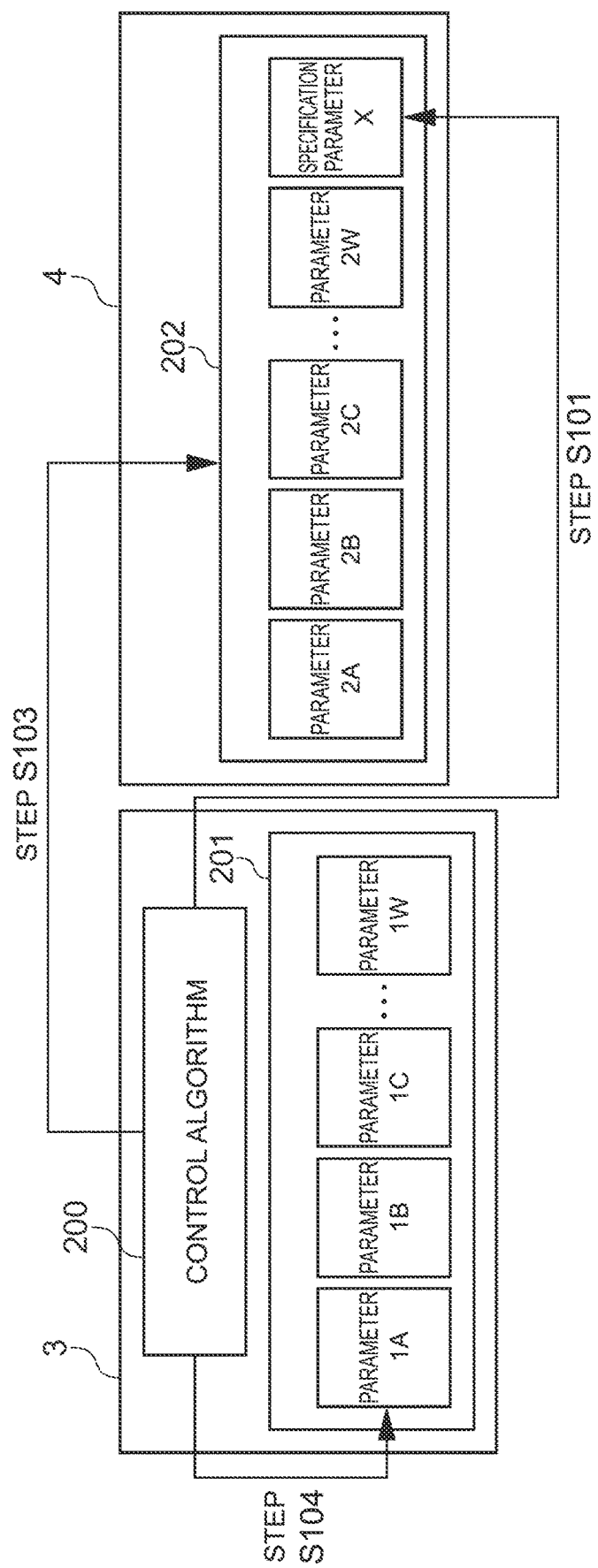
FIG. 5 is a diagram for describing a function of a specification parameter.

FIG. 4 is a flowchart showing a processing flow for the control algorithm 200 to read a parameter group and execute a motor control program and FIG. 5 is a diagram for describing a function of the specification parameter X. First, the motor control circuit 10 reads the control algorithm 200 stored in the first non-volatile memory 3 into the RAM 2, and when the control algorithm 200 starts, the control algorithm 200 reads the specification parameter X in the second non-volatile memory 4 (step S101) and determines whether the specification parameter X is "0" or "1" (step S102). Note that although the present Specification describes that when the specification parameter X is "0", the control algorithm 200 executes the program using the second parameter group 202 (parameters 2A, 2B, . . . 2W) stored in the second non-volatile memory 4 and when the specification parameter X is "1", the control algorithm 200 executes the program using the first parameter group 201 (parameters 1A, 1B, . . . 1W) stored in the first non-volatile memory 3, the process of the control algorithm 200 is not limited to this.

When the specification parameter X is "0" (step S102: Yes), the control algorithm 200 reads the second parameter group 202 (parameters 2A, 2B, . . . 2W) stored in the second non-volatile memory 4 and stores the second parameter group 202 in the RAM 2 (step S103) and thereby executes the program (step S105). The control algorithm 200 executes the program using the second parameter group 202 (parameters 2A, 2B, . . . 2W) stored in the second non-volatile memory 4 and can thereby implement a changed or adjusted function.

When the specification parameter X is "1" (step S102: No), the control algorithm 200 reads the first parameter group 201 (parameters 1A, 1B, . . . 1W) stored in the first non-volatile memory 3 and stores the first parameter group 201 in the RAM 2 (step S104) and thereby executes the program (step S105). The control algorithm 200 executes the program using the first parameter group 201 (parameters 1A, 1B, . . . 1W) stored in the first non-volatile memory 3, and can thereby implement the basic functions defined during mass production.

The program execution process is continued (returning to step S105) until the program execution is completed (step S106: Yes).

In the present embodiment, the initial value of the specification parameter X is "1". That is, when the value of the specification parameter X has not been rewritten, the value of the specification parameter X is "1", and so in the parameter reading process of the control algorithm 200 in FIG. 4, the control algorithm 200 executes the program using the first parameter group 201 (parameters 1A, 1B, . . . 1W) stored in the first non-volatile memory 3. When the control algorithm 200 prefers to execute the program using the second parameter group 202 stored in the second non-volatile memory 4, the control algorithm 200 rewrites the specification parameter X to "0" and uses the second parameter group 202 (parameters 2A, 2B, . . . 2W) to thereby execute the desired program.

(Program Writing Method)

A program writing method for the fan apparatus 100 equipped with the motor control circuit 10 of the present embodiment will be described.

Figure 6:
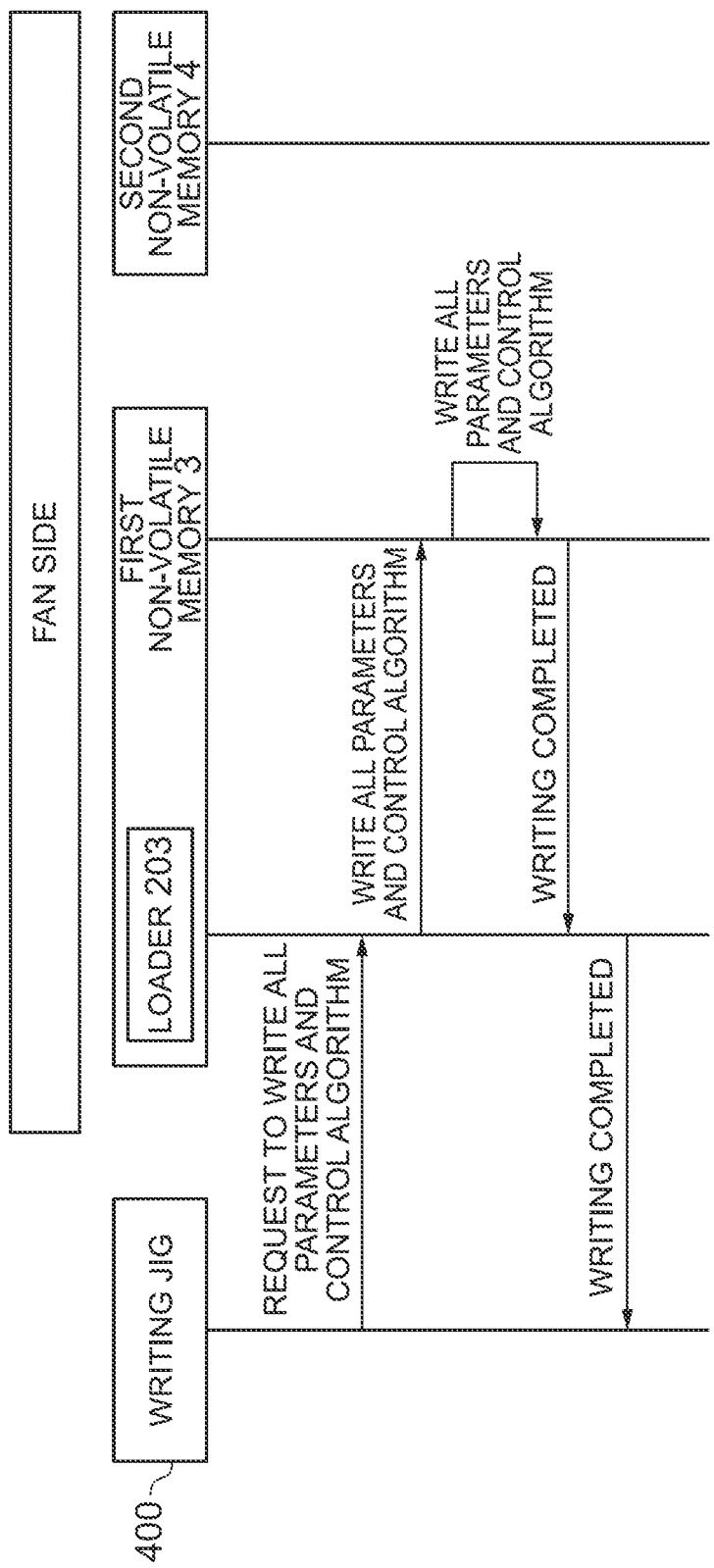
FIG. 6 is a sequence diagram showing a motor control program writing method of a fan apparatus equipped with the motor control circuit of the present embodiment during mass production.

FIG. 6 is a sequence diagram describing a motor control program writing method of the fan apparatus 100 equipped with the motor control circuit 10 of the present embodiment during mass production. This sequence diagram is an example where the program is written using a writing jig 400 (see FIG. 3) from outside the fan apparatus 100 via a loader 203 (see FIG. 3) in the first non-volatile memory 3 of the motor control circuit 10.

As illustrated in FIG. 6, in the fan apparatus 100 equipped with the motor control circuit 10 of the present embodiment, the writing jig 400 can request the loader 203 to write all the parameters and the control algorithm 200. The loader 203 writes all the parameters (first parameter group 201) and the control algorithm 200 to the first non-volatile memory 3 in the same step. When the writing is completed, the loader 203 notifies the writing jig 400 that the writing is completed. In this way, according to the motor control circuit 10 of the present embodiment, it is possible to store the program (all the parameters and the control algorithm 200) with one write request from the writing jig 400 during mass production. Note that the motor control circuit 10 of the present embodiment may also write the program to the first non-volatile memory 3 during development before mass production using the same technique as the technique during mass production.

Fan apparatuses equipped with a conventional motor control circuit store a control algorithm in one non-volatile memory and store parameter groups in another non-volatile memory during mass production. In this case, the writing jig cannot request the loader to write all the parameters and the control algorithm collectively. That is, it is necessary to make a write request for the control algorithm, receive a notification of write completion of the control algorithm before making a write request for the parameters. Therefore, it is necessary for the conventional motor control circuit to store the program with two-stage write requests from the writing jig during mass production.

In this way, the conventional motor control circuit has to store the program with two-stage write requests from the writing jig during mass production, whereas according to the motor control circuit 10 of the present embodiment, the program can be stored with one write request from the writing jig 400. Therefore, according to the motor control circuit 10 of the present embodiment, it is possible to suppress an increase in cycle time during mass production compared to the conventional motor control circuit.

The fan apparatus 100 equipped with the motor control circuit 10 of the present embodiment does not use parameters for changing or adjusting the functions (second parameter group 202) during mass production as illustrated in FIG. 6. Instead, when it is necessary to change or adjust the functions, for example, during development before mass production or at the time of functional adjustment including a change or adjustment of the functions after mass production (hereinafter referred to as "time of functional adjustment"), it is possible to use parameters for change or adjustment (second parameter group 202).

Figure 7:
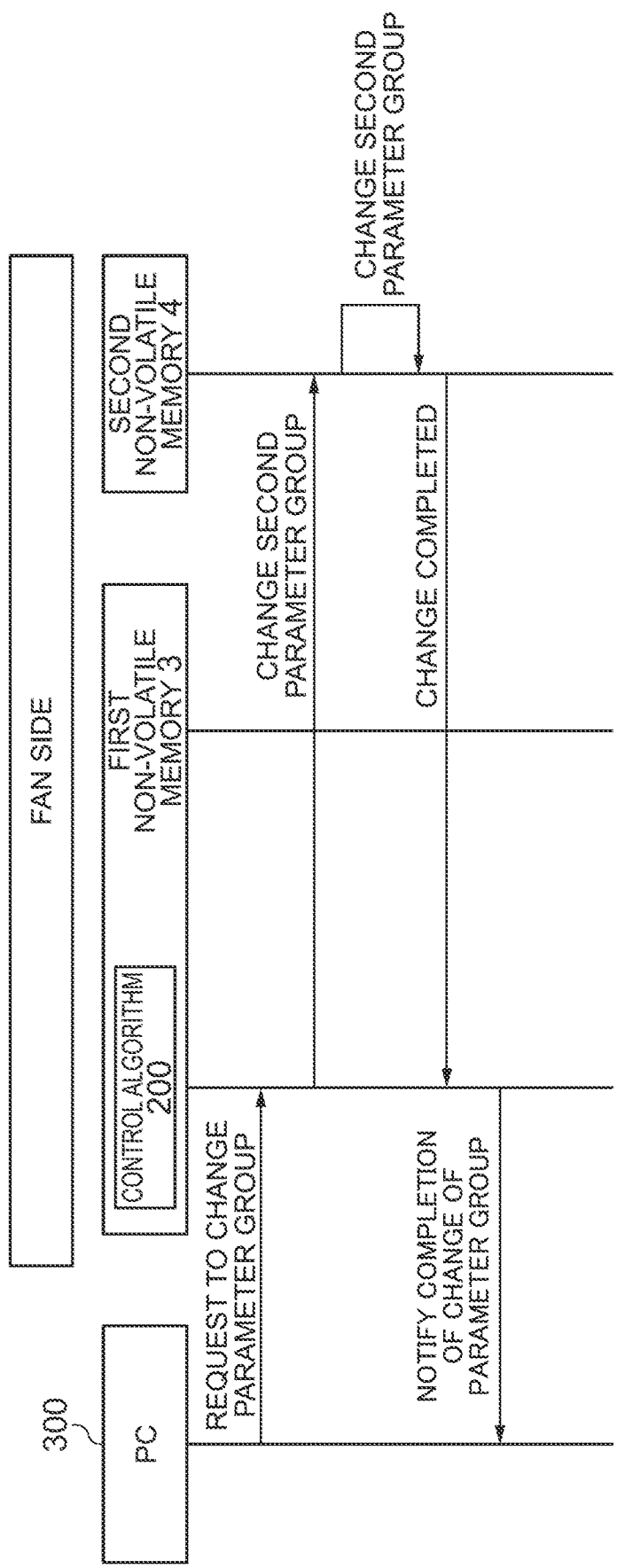
FIG. 7 is a diagram showing a parameter group changing method during development before mass production or at the time of a change or adjustment after mass production.
Figure 8:
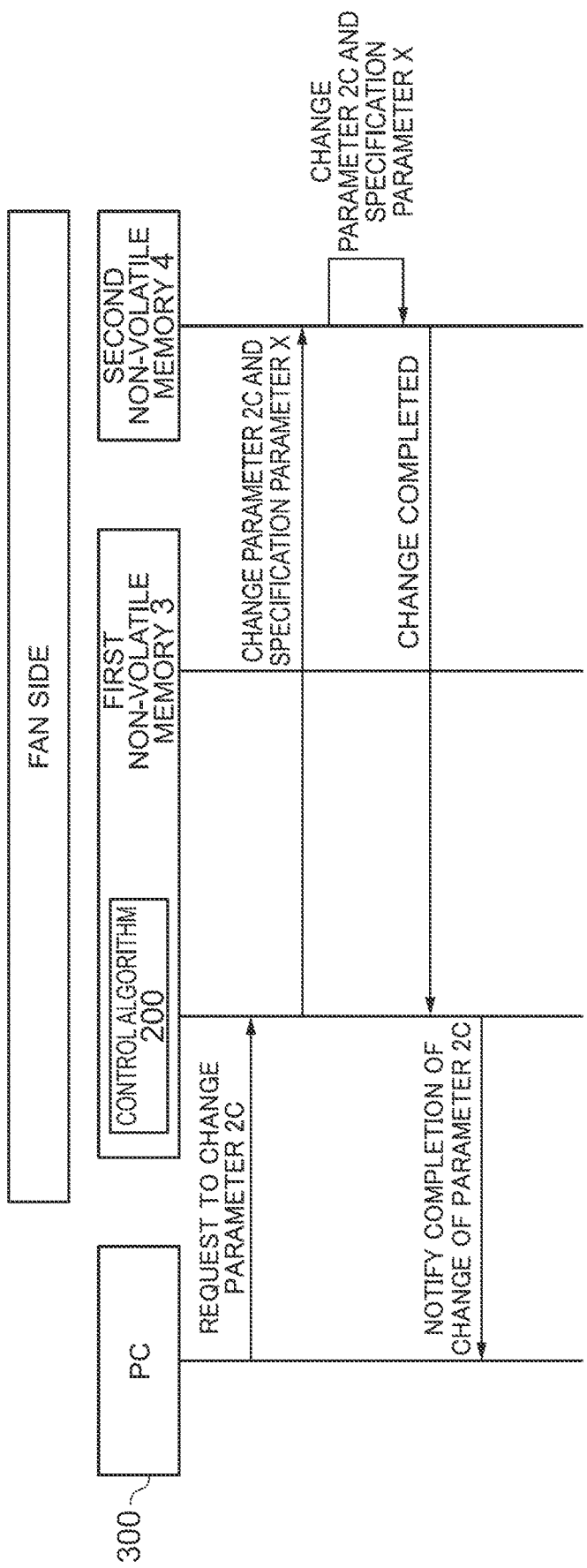
FIG. 8 is a diagram showing a parameter changing method during development before mass production or at the time of a change or adjustment after mass production.
Figure 9:
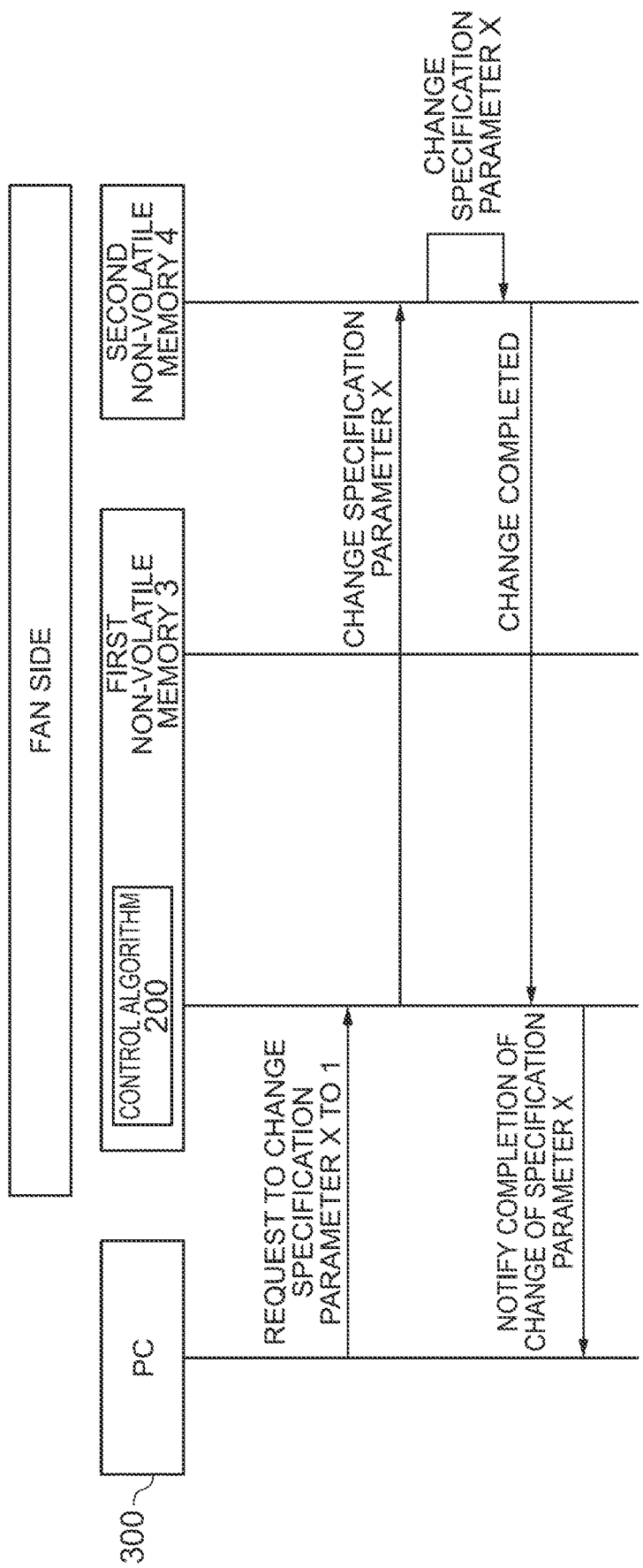
FIG. 9 is a diagram showing a specification parameter changing method during development before mass production or at the time of a change or adjustment after mass production.

FIG. 7 to FIG. 9 are diagrams showing a motor control program changing method during development before mass production or at the time of functional adjustment after mass production. FIG. 7 is a diagram showing a parameter group changing method during development before mass production or at the time of functional adjustment after mass production (more specifically, an example of a case where all the parameters of the second parameter group 202 for functional change or adjustment are changed collectively), FIG. 8 is a diagram showing a parameter changing method during development before mass production or at the time of functional adjustment after mass production (more specifically, an example of a case where some parameters of the second parameter group 202 for functional change or adjustment are changed), and FIG. 9 is a diagram showing a specification parameter changing method during development before mass production or at the time of functional adjustment after mass production (more specifically, an example of a case where the parameter group to be used by the control algorithm 200 is restored to the first parameter group 201 during mass production). FIG. 7 to FIG. 9 are examples where the CPU 1 changes the parameter group according to the control algorithm 200 in response to a parameter change request from a PC 300.

In order to change or adjust a function defined as a function during mass production, when the control algorithm 200 attempts to execute the program using the second parameter group 202 different from the first parameter group 201 stored in the first non-volatile memory 3 during mass production, the parameter groups can be changed collectively as illustrated in FIG. 7. As illustrated in FIG. 7, when the CPU 1 receives a request to change all the parameter groups from the PC 300, the CPU 1 changes the second parameter group 202 of the second non-volatile memory 4 according to the control algorithm 200. When the change of the second parameter group 202 is completed in the second non-volatile memory 4, the CPU 1 notifies the PC 300 of the change completion of the second parameter group 202 according to the control algorithm 200. The change of the second parameter group 202 also includes a change of the specification parameter X and the specification parameter X is changed to "0" different from the initial value. The specification parameter X becomes "0", and so the control algorithm 200 reads the second parameter group 202 stored in the second non-volatile memory 4 and executes the program. Therefore, the functions defined during mass production are changed or adjusted.

When, in order to change or adjust only some of the functions defined during mass production, an attempt is made to execute the motor control program using a parameter different from some of the parameters of the first parameter group 201 stored in the first non-volatile memory 3 during mass production, some of the parameters of the second parameter group 202 can be changed. As illustrated in FIG. 8, upon receiving a request to change a parameter 2C, which is one parameter of the second parameter group 202 from the PC 300, the CPU 1 changes the parameter 2C and the specification parameter X of the second non-volatile memory 4 according to the control algorithm 200. The specification parameter X is changed to "0" different from the initial value. If the specification parameter X is originally set to "0" different from the initial value when the request to change the parameter 2C is received, the value of the specification parameter X need not be changed. When the changes of the parameter 2C and the specification parameter X are completed in the second non-volatile memory 4, the CPU 1 notifies the PC 300 of change completion of the parameter 2C according to the control algorithm 200. Together with the parameter 2C, the specification parameter X is changed to "0" different from the initial value, and so the control algorithm 200 executes the program using the second parameter group 202 including the parameter 2C stored in the second non-volatile memory 4. Therefore, only some of the functions defined during mass production are changed or adjusted.

After the functions defined during mass production are changed or adjusted, if the control algorithm 200 attempts to execute the program using the first parameter group 201 stored in the first non-volatile memory 3 during mass production to restore the functions to the functions defined during mass production, it is possible to change the specification parameter X as illustrated in FIG. 9. As illustrated in FIG. 9, when the CPU 1 receives a request to change the specification parameter X from the PC 300, the CPU 1 changes the specification parameter X stored in the second parameter group 202 of the second non-volatile memory 4 according to the control algorithm 200. The specification parameter X is changed to "1" the same as the initial value. When the change of the specification parameter X is completed in the second non-volatile memory 4, the CPU 1 notifies the PC 300 of the change completion of the specification parameter X according to the control algorithm 200. Since the specification parameter X becomes "1" the same as the initial value, the control algorithm 200 reads the first parameter group 201 stored in the first non-volatile memory 3 and executes the program. Therefore, the functions defined as functions during mass production are executed.

(Modification of Embodiments)

According to the motor control circuit of the present embodiments described so far, it is possible to suppress an increase in cycle time during mass production in the motor control circuit enabled to change or adjust the functions to be implemented by rewriting parameters stored in the non-volatile memory.

Specific examples have been described using the fan apparatus in the configuration in FIG. 1 in the embodiments so far. However, the configuration of the fan apparatus, the configuration of the motor control circuit and the configuration of the motor drive control apparatus are not particularly limited to the described examples.

Regarding the hardware configuration of the motor control circuit, the configuration illustrated in FIG. 2 or the like is described as a specific example and is not limited to this configuration. A case has been described in the above-described embodiments where the non-volatile memory has been formed as the first non-volatile memory 3 and the second non-volatile memory 4 as physically separate memories, for example. The two non-volatile memories 3 and 4 need not be physically separate configurations, but may also be formed of one non-volatile memory provided with two storage regions. For example, using one flash memory, a virtual address space is defined, a plurality of real memory spaces to be actually accessed are associated with the virtual address space, and it is thereby possible to convert the target of access by software as if two storage regions apparently exist. These two storage regions can be used as the first non-volatile memory 3 and the second non-volatile memory 4.

A specific example has also been described about the control method for a motor control circuit including a process for the control algorithm 200 of the motor control circuit illustrated in FIGS. 4 and 5 to read parameters and execute the program. However, the control method for a motor control circuit is not limited to this specific example.

The program writing method illustrated in FIG. 6 and the parameter changing method illustrated in FIG. 7 to FIG. 9 have also been described using specific examples, and the methods are not limited to these specific examples.

The present embodiments have been described assuming that the specification parameter X is included in the second parameter group 202, but the specification parameter X needs only to be included in the second non-volatile memory 4 (that is, the second storage region), and the specification parameter X need not be included in the second parameter group 202.

What is claimed is:

1. A motor control circuit to control a motor driver, comprising:
    a first storage region; and
    a second storage region, wherein
    the first storage region stores a control algorithm of the motor control circuit and a first parameter group to be used by the control algorithm,
    the second storage region can store a second parameter group to be used by the control algorithm,
    the second storage region comprises a specification parameter to specify whether the first parameter group or the second parameter group is used by the control algorithm to execute a motor control program, and
    the control algorithm reads a value of the specification parameter at a startup and executes the motor control program using the parameter group specified with the read value.

2. The motor control circuit according to claim 1, wherein when the specification parameter is set to an initial value, the control algorithm executes the motor control program using the first parameter group.

3. The motor control circuit according to claim 1, wherein the control algorithm executes the motor control program using either the first parameter group or the second parameter group to output a drive control signal for controlling of driving of a motor to the motor driver.

4. A motor drive control apparatus, comprising:
    the motor control circuit according to claim 1; and
    a motor driver configured to drive the motor based on a drive control signal outputted from the motor control circuit.

5. A control method for a motor control circuit comprising a first storage region storing a motor control circuit control algorithm and a first parameter group to be used by the control algorithm and a second storage region enabled to store a second parameter group to be used by the control algorithm, and configured to output a drive control signal to a motor driver, the method comprising:
    referencing a value of a specification parameter in the second storage region when the control algorithm is started;
    determining whether the first parameter group or the second parameter group is used by the control algorithm to execute a motor control program based on the value of the specification parameter; and
    executing of the control algorithm the motor control program using the determined parameter group.

6. The control method for a motor control circuit according to claim 5, wherein
    in the determining, when the value of the specification parameter is set to an initial value, the control algorithm determines to execute the motor control program using the first parameter group stored in the first storage region.

7. A motor control circuit to control a motor driver, comprising:
    a first storage region; and
    a second storage region, wherein
    the first storage region stores a control algorithm of the motor control circuit and a first parameter group to be used by the control algorithm,
    the second storage region can store a second parameter group to be used by the control algorithm, and
    the control algorithm executes the motor control program using either the first parameter group or the second parameter group to output a drive control signal for controlling of driving of a motor to the motor driver.

8. A motor drive control apparatus, comprising:
    the motor control circuit according to claim 7; and
    a motor driver configured to drive the motor based on a drive control signal outputted from the motor control circuit.

* * * * *